(12) United States Patent
Takayanagi et al.

(10) Patent No.: US 11,267,518 B2
(45) Date of Patent: Mar. 8, 2022

(54) VEHICLE SIDE SECTION STRUCTURE

(71) Applicants: TOYOTA JIDOSHA KABUSHIKI KAISHA, Aichi-ken (JP); TOYOTA SHATAI KABUSHIKI KAISHA, Kariya (JP)

(72) Inventors: Junichi Takayanagi, Nagoya (JP); Toshihisa Miura, Kariya (JP)

(73) Assignees: TOYOTA JIDOSHA KABUSHIKI KAISHA, Aichi-ken (JP); TOYOTA SHATAI KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/437,793

(22) Filed: Jun. 11, 2019

(65) Prior Publication Data

US 2019/0382057 A1 Dec. 19, 2019

(30) Foreign Application Priority Data

Jun. 18, 2018 (JP) .............................. JP2018-115384

(51) Int. Cl.
*B62D 21/15* (2006.01)
*B62D 25/04* (2006.01)
*B62D 29/02* (2006.01)

(52) U.S. Cl.
CPC ........... *B62D 29/02* (2013.01); *B62D 21/152* (2013.01); *B62D 25/04* (2013.01)

(58) Field of Classification Search
CPC ......... B62D 29/02; B62D 25/00; B62D 25/04
USPC ................................................... 296/193.06
See application file for complete search history.

(56) References Cited

U.S. PATENT DOCUMENTS

| 5,941,597 | A  | * | 8/1999  | Horiuchi ................ | B62D 25/04 |
| | | | | | 296/203.01 |
| 9,085,323 | B2 | | 7/2015  | Busch et al. | |
| 9,150,254 | B2 | | 10/2015 | Torii | |
| 9,187,135 | B1 | * | 11/2015 | Redmer ................. | B62D 25/02 |
| 9,221,413 | B2 | | 12/2015 | Okuda | |
| 9,815,498 | B2 | * | 11/2017 | Yamamoto ............ | B62D 25/04 |
| 9,988,087 | B2 | | 6/2018  | Yamamoto | |
| 10,040,488 | B2 | | 8/2018  | Atzmuller et al. | |

(Continued)

FOREIGN PATENT DOCUMENTS

| CN | 102574548 A | 7/2012 |
| CN | 105189259 A | 12/2015 |

(Continued)

OTHER PUBLICATIONS

Office Action in U.S. Appl. No. 16/141,472, dated Dec. 23, 2019, 21pp.

(Continued)

*Primary Examiner* — D Glenn Dayoan
*Assistant Examiner* — Kevin P Weldon
(74) *Attorney, Agent, or Firm* — Hauptman Ham, LLP

(57) ABSTRACT

A vehicle side section structure includes a pair of front pillars that are respectively provided at both vehicle width direction sides of a vehicle front section so as to extend along a vehicle vertical direction, and a reinforcing member formed of wood and is provided inside a cross-section of at least one of the pair of front pillars, an axial center direction of tree rings of the reinforcing member being oriented in a direction running along a length direction of the at least one front pillar.

2 Claims, 4 Drawing Sheets

(56) References Cited

U.S. PATENT DOCUMENTS

| | | | |
|---|---|---|---|
| 2008/0315628 A1 | 12/2008 | Obayashi | |
| 2012/0153669 A1* | 6/2012 | Nagwanshi | B62D 29/005 |
| | | | 296/187.08 |
| 2012/0161475 A1 | 6/2012 | Mori | |
| 2013/0200650 A1* | 8/2013 | Matsuoka | B62D 21/155 |
| | | | 296/187.1 |
| 2013/0313859 A1* | 11/2013 | Barz | B62D 25/04 |
| | | | 296/193.06 |
| 2014/0346789 A1 | 11/2014 | Okuda | |
| 2016/0046325 A1 | 2/2016 | Yamamoto et al. | |
| 2016/0101815 A1* | 4/2016 | Schnug | B62D 25/02 |
| | | | 296/187.12 |
| 2016/0229457 A1* | 8/2016 | Boettcher | B62D 29/002 |
| 2016/0257344 A1* | 9/2016 | Hasegawa | B62D 25/04 |
| 2019/0084512 A1 | 3/2019 | Takayanagi et al. | |
| 2019/0111974 A1 | 4/2019 | Takayanagi et al. | |

FOREIGN PATENT DOCUMENTS

| | | | | | |
|---|---|---|---|---|---|
| DE | 102013204953 | | * | 10/2014 | |
| EP | 3085605 | A1 | * | 10/2016 | B62D 25/02 |
| GB | 296439 | A | | 1/1929 | |
| GB | 337137 | | * | 10/1930 | B64D 29/02 |
| JP | 2008230032 | A | | 10/2008 | |
| JP | 2013132943 | A | | 7/2013 | |
| JP | 2013220725 | A | | 10/2013 | |
| JP | 2014-159187 | A | | 9/2014 | |
| JP | 2014-184899 | A | | 10/2014 | |
| JP | 2018112012 | A | | 7/2018 | |
| JP | 2019-51833 | A | | 4/2019 | |
| JP | 2019-73097 | A | | 5/2019 | |
| KR | 20020090666 | A | * | 12/2002 | B62D 25/04 |
| KR | 2004020786 | A | * | 4/2004 | B62D 25/04 |
| WO | 2011030463 | A1 | | 3/2011 | |
| WO | 2014167742 | A1 | | 10/2014 | |

OTHER PUBLICATIONS

Office Action in U.S. Appl. No. 16/141,472, dated Jun. 22, 2020, 7pp.

Office Action in CN Application No. 201811131064.X, dated Oct. 10, 2020, 12pp.

Gao Feng et al., "Science Foundation of Building Materials", Tongji University Press, pp. 280-287, Aug. 31, 2016, 10pp.

Office Action in U.S. Appl. No. 16/141,472, dated Jan. 21, 2021, 15pp.

* cited by examiner

VEHICLE SIDE SECTION STRUCTURE

RELATED APPLICATIONS

The present application claims priority to Japanese Patent Application Number 2018-115384 filed Jun. 18, 2018, the disclosure of which is hereby incorporated by reference herein in its entirety.

BACKGROUND

Technical Field

The present disclosure relates to a vehicle side section structure.

Related Art

Japanese Patent Application Laid-Open (JP-A) No. 2014-159187 discloses a reinforcing device that reinforces a front pillar. The reinforcing device includes a frame provided inside the front pillar. The front pillar is reinforced by fixing plural foamed bodies with the same shape as each other to the frame.

In the structure described in JP-A No. 2014-159187, reinforcing the front pillar using the foamed bodies enables an increase in weight to be suppressed in comparison to cases in which a metal reinforcing member is employed. However, the plural foamed bodies are disposed with spacings therebetween, and so there is a possibility than collision load input to the front pillar in a head-on collision might not be dispersed, resulting in localized deformation of the front pillar.

SUMMARY

The present disclosure provides a vehicle side section structure that may suppress localized deformation of a front pillar, while suppressing an increase in weight.

A first aspect of the present disclosure is a vehicle side section structure including a pair of front pillars that are respectively provided at both vehicle width direction sides of a vehicle front section so as to extend along a vehicle vertical direction; and a reinforcing member formed of wood and provided inside a cross-section of at least one of the pair of front pillars, an axial center direction of tree rings of the reinforcing member being oriented in a direction running along a length direction of the at least one front pillar.

In the vehicle side section structure according to the first aspect, the pair of front pillars are respectively provided at both vehicle width direction sides of the vehicle front section, and the front pillars extend along the vehicle vertical direction. The reinforcing member is disposed inside the cross-section of at least one of the pair of front pillars. The axial center direction of the tree rings of the reinforcing member is oriented in a direction running along the length direction of the at least one front pillar. Collision load input to the front pillar in a head-on collision is dispersed along the axial center direction of the tree rings, thereby may suppress localized deformation of the front pillar.

The reinforcing member is formed using wood, thereby may suppress an increase in weight in comparison to cases in which, for example, the plate thickness of the front pillar is increased, or cases in which a separate metal reinforcing member is employed. Note that the axial center direction of the tree rings herein refers to a direction running along the central axis of the tree rings of the wood in a state prior to being cut.

A second aspect of the present disclosure, in the first aspect, may further include a front header that couples upper end portions of the pair of front pillars together in the vehicle width direction, wherein an upper end portion of the reinforcing member is positioned at a connecting portion between the at least one front pillar and the front header, or further toward a vehicle rear side than the connecting portion.

In the vehicle side section structure according to the second aspect, since the reinforcing member extends as far as the connecting portion between the at least one front pillar and the front header, collision load input to the front pillar is transmitted to the front header through the reinforcing member.

In a third aspect of the present disclosure, in the first aspect or the second aspect, the at least one front pillar may include an inclined section that is inclined toward a vehicle lower side on progression from a vehicle rear side toward a vehicle front side, and an enlarged width section that extends from a lower end portion of the inclined section toward the vehicle lower side and is wider in width than the inclined section; and a lower end portion of the reinforcing member may be positioned further toward a lower side than a boundary portion between the inclined section and the enlarged width section.

In the vehicle side section structure according to the third aspect, the lower end portion of the reinforcing member is positioned further toward the lower side than the boundary portion between the inclined section and the enlarged width section of the front pillar. Namely, the reinforcing member extends as far as the enlarged width section. This prevents localized snapping of the inclined section of the front pillar in a vehicle head-on collision.

In a fourth aspect of the present disclosure, in the first aspect or the second aspect, the at least one front pillar may include an inclined section that is inclined toward a vehicle lower side on progression from a vehicle rear side toward a vehicle front side; and the reinforcing member may be disposed at a vehicle front-rear direction central portion of the inclined section of the at least one front pillar.

In a fifth aspect is of the present disclosure, in any one of the first through fourth aspects, the reinforcing member may be configured using engineered wood.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
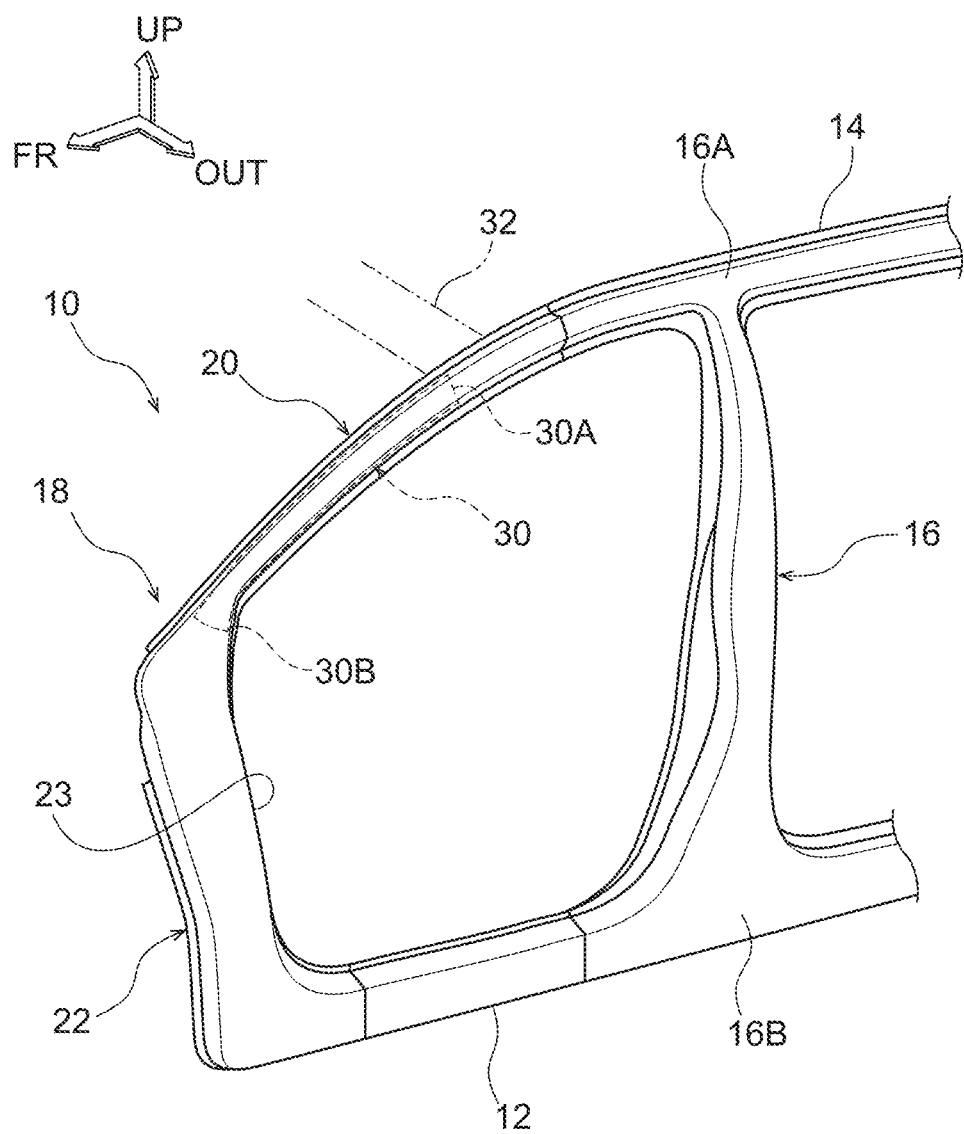
FIG. 1 is a perspective view illustrating a side section of a vehicle installed with a vehicle side section structure according to a first exemplary embodiment.

Explanation follows regarding a vehicle side section structure according to a first exemplary embodiment, with reference to the drawings. Note that in the drawings, the arrow FR, the arrow UP, and the arrow OUT respectively indicate a front direction, an upward direction, and a vehicle width direction outer side of a vehicle, as appropriate. In the following explanation, unless specifically stated otherwise, reference simply to front, rear, up, down, left, and right directions refers to front and rear in a vehicle front-rear direction, up and down in a vehicle vertical direction, and left and right in a vehicle width direction when facing the direction of forward travel.

As illustrated in FIG. 1, a side section of a vehicle 10 applied with the vehicle side section structure is configured including a rocker 12, a roof side rail 14, a center pillar 16, and a front pillar 18. Note that although FIG. 1 only illustrates a vehicle side section on the vehicle left side and omits illustration of a vehicle side section on the vehicle right side, the vehicle side sections are structured with left-right symmetry to each other.

The rocker 12 is a framework member with a closed cross-section profile extending along the vehicle front-rear direction at the lower side of the vehicle side section. The roof side rail 14 is a framework member with a closed cross-section profile extending along the vehicle front-rear direction at the upper side of the vehicle side section.

The center pillar 16 extends along the vehicle vertical direction at a vehicle front-rear direction central portion of the vehicle side section. An upper end portion 16A of the center pillar 16 is connected to the roof side rail 14 extending along the vehicle front-rear direction. A lower end portion 16B of the center pillar 16 is connected to the rocker 12.

The front pillar 18 is provided further toward the vehicle front side than the center pillar 16. The front pillar 18 extends along the vehicle vertical direction at the vehicle front-rear direction front side of the vehicle side section. The front pillar 18 is configured including an inclined section 20 and an enlarged width section 22.

The inclined section 20 is inclined toward the vehicle lower side on progression from the vehicle rear side toward the vehicle front side in side view. A rear end portion (upper end portion) of the inclined section 20 is connected to a front end portion of the roof side rail 14. A front header 32 that extends along the vehicle width direction is connected to an upper portion of the inclined section 20. Upper end portions of the left and right front pillars 18 are coupled together in the vehicle width direction by the front header 32.

A front end portion of the inclined section 20 is connected to the enlarged width section 22. The enlarged width section 22 extends along the vehicle vertical direction, and is formed wider in width than the inclined section 20. An upper end portion of the enlarged width section 22 gradually narrows in width and is connected to the inclined section 20. A lower end portion of the enlarged width section 22 is connected to the rocker 12.

In the above manner, the rocker 12, the roof side rail 14, the center pillar 16, and the front pillar 18 form a front door opening (door opening) 23 in the side section of the vehicle 10. The front door opening 23 is opened and closed off by a front door, not illustrated in the drawings.

Figure 3:
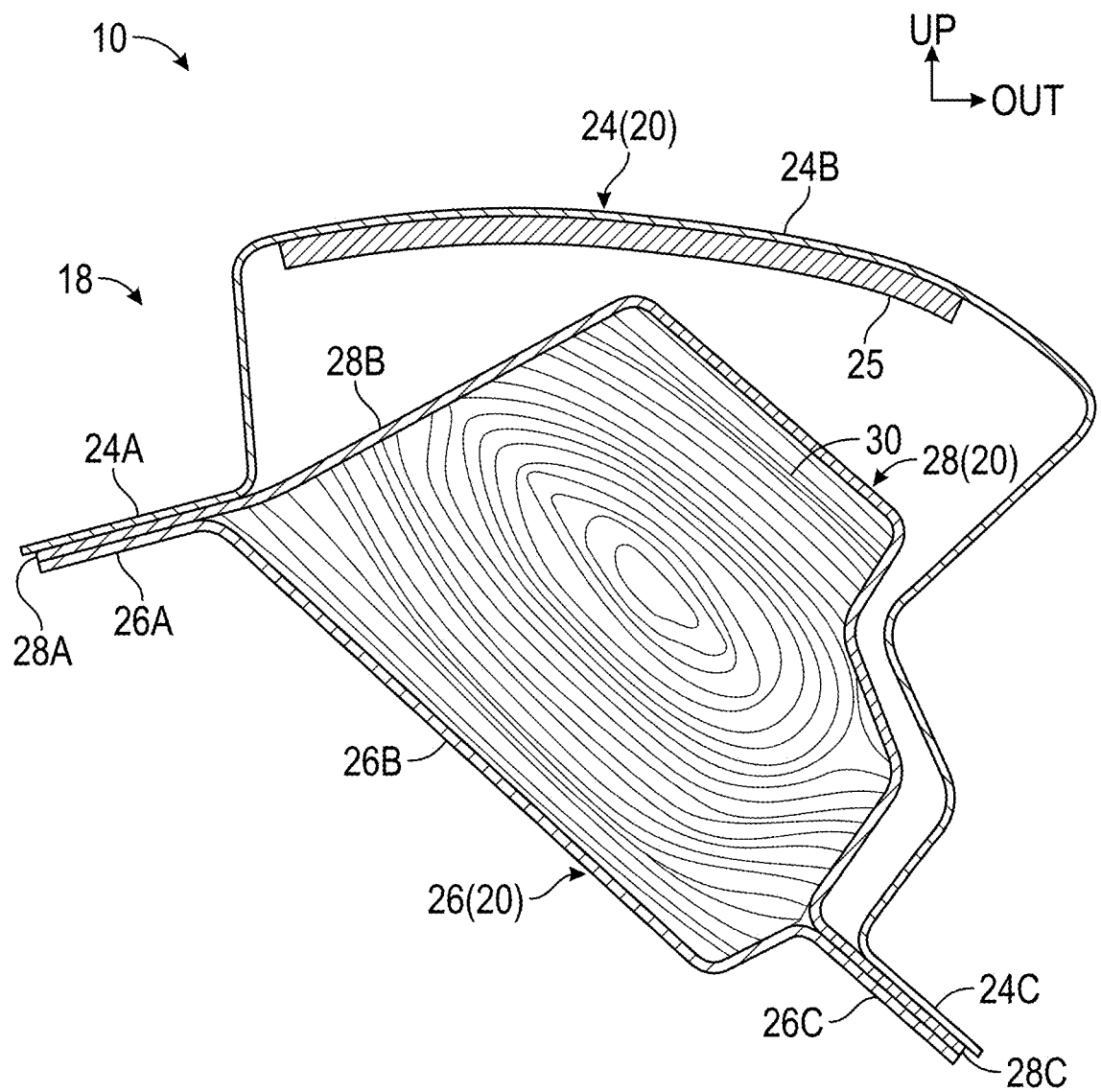
FIG. 3 is an enlarged cross-section illustrating a state sectioned along line 3-3 in FIG. 2.

As illustrated in FIG. 3, the front pillar 18 is configured including a pillar inner panel 26, outer reinforcement 28, and a side member outer panel 24. The pillar inner panel 26 is formed with a flattened, substantially M-shaped profile as viewed along the vehicle front-rear direction. An inner-side inward flange 26A extends along the vehicle width direction at an inner side end portion of the pillar inner panel 26. An inner-side outward flange 26C extends along the vehicle width direction at an outer side end portion of the pillar inner panel 26. A location of the pillar inner panel 26 between the inner-side inward flange 26A and the inner-side outward flange 26C configures an inner-side protrusion 26B that protrudes downward.

The outer reinforcement 28 is disposed at the vehicle outer side of the pillar inner panel 26, and is formed with a substantially hat-shaped cross-section profile open toward the vehicle lower side as viewed along the vehicle front-rear direction. An outer-side inward flange 28A extends along the vehicle width direction at an inner side end portion of the outer reinforcement 28. The outer-side inward flange 28A and the inner-side inward flange 26A are joined together in a superimposed state. An outer-side outward flange 28C extends along the vehicle width direction at an outer side end portion of the outer reinforcement 28. The outer-side outward flange 28C and the inner-side outward flange 26C are joined together in a superimposed state. A location of the outer reinforcement 28 between the outer-side inward flange 28A and the outer-side outward flange 28C configures an outer-side protrusion 28B that protrudes upward.

The side member outer panel 24 is disposed at the vehicle outer side of the outer reinforcement 28. The side member outer panel 24 is formed with a substantially hat-shaped cross-section profile open toward the vehicle lower side as viewed along the vehicle front-rear direction. A side member inward flange 24A extends along the vehicle width direction at an inner side end portion of the side member outer panel 24. The side member inward flange 24A and the outer-side inward flange 28A are joined together in a superimposed state. A side member outward flange 24C extends along the vehicle width direction at an outer side end portion of the side member outer panel 24. The side member outward flange 24C and the outer-side outward flange 28C are joined together in a superimposed state. A location of the side member outer panel 24 between the side member inward flange 24A and the side member outward flange 24C configures a side member protrusion 24B that protrudes upward. A foamed material 25 is attached to an inner face of the side member protrusion 24B. Noise and vibration (NV) performance of the front pillar 18 is improved by the foamed material 25.

Note that a reinforcing member 30 is provided inside a closed cross-section configured by the pillar inner panel 26 and the outer reinforcement 28. The reinforcing member 30 is formed with a profile corresponding to the closed cross-section.

Figure 2:
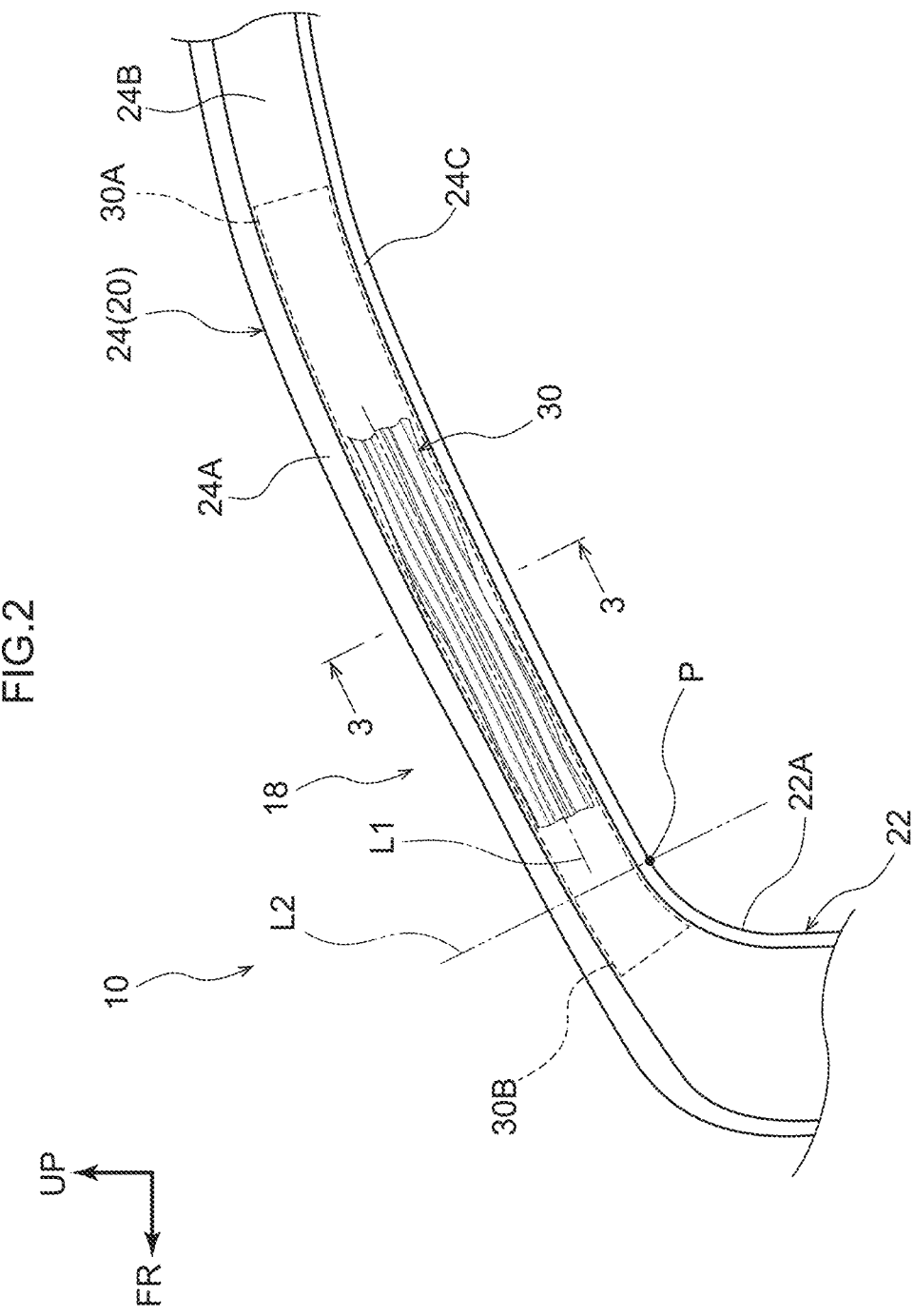
FIG. 2 is an enlarged view illustrating a relevant portion of FIG. 1 in a partially cutaway state.

As illustrated in FIG. 2, the reinforcing member 30 is formed in an elongated shape with its length direction running along the direction of the inclined section 20 of the front pillar 18, and is configured using engineered wood. An axial center direction of the tree rings of the reinforcing member 30 is oriented in a direction running along the length direction of the front pillar 18. Namely, the axial center of the tree rings of the reinforcing member 30 extends along an imaginary line L1 extending along the length direction of the front pillar 18.

As illustrated in FIG. 1, an upper end portion 30A of the reinforcing member 30 is either positioned at a connection portion of the front pillar 18 to the front header 32, or is positioned further to the vehicle rear side than the connection portion. In the present exemplary embodiment, the upper end portion 30A is positioned at the connection portion. Here, the connection portion refers to a region spanning from a position where a front edge of the front header 32 intersects the front pillar 18 to a position where a rear edge of the front header 32 intersects the front pillar 18.

As illustrated in FIG. 2, a lower end portion 30B of the reinforcing member 30 is positioned further toward the vehicle lower side than a boundary portion between the inclined section 20 and the enlarged width section 22 of the front pillar 18. In the present exemplary embodiment, a curved portion 22A is formed at the vehicle rear side of the upper end portion of the enlarged width section 22. An imaginary line L2 that passes through a point P, the point P being at an upper end of the curved portion 22A, and that is orthogonal to the axial center of the inclined section 20 configures a boundary line between the inclined section 20 and the enlarged width section 22. The lower end portion 30B of the reinforcing member 30 is positioned further toward the vehicle lower side (vehicle front side) than the boundary line. Namely, the lower end portion 30B of the reinforcing member 30 extends as far as the enlarged width section 22.

Note that "a boundary portion between the inclined section 20 and the enlarged width section 22" refers to a portion including a region in close proximity to the imaginary line L2 configuring the boundary line between the inclined section 20 and the enlarged width section 22, and is not strictly limited to configurations in which the lower end portion 30B of the reinforcing member 30 is positioned further toward the vehicle lower side than the imaginary line L2. Namely, the concept includes configurations in which the position of the lower end portion 30B of the reinforcing member 30 is positioned slightly further toward the vehicle upper side than the imaginary line L2 if still within a range in which the inclined section 20 is provided with sufficient durability.

In the present exemplary embodiment, the reinforcing member 30 is provided to both of the left and right pair of front pillars 18. However, a configuration may be applied in which the reinforcing member 30 is only provided to one of the front pillars 18.

Operation

Explanation follows regarding operation of the present exemplary embodiment.

In the vehicle side section structure of the present exemplary embodiment, the axial center direction of the tree rings of the reinforcing member 30 is oriented in a direction running along the length direction of the front pillar 18. Load is therefore dispersed along the axial center direction of the tree rings. Thus, in the event of a vehicle head-on collision or the like, collision load may be dispersed along the vehicle front-rear direction, enabling localized deformation of the front pillar 18 to be suppressed.

Moreover, forming the reinforcing member 30 using wood as in the present exemplary embodiment enables an increase in weight to be suppressed in comparison to cases in which, for example, the plate thickness of the front pillar 18 is increased, or cases in which a separate metal reinforcing member is employed. This enables localized deformation of the front pillar 18 to be suppressed, while suppressing an increase in the weight of the front pillar 18. Note that the axial center direction of the tree rings herein refers to a direction running along the central axis of the tree rings of the wood in a state prior to being cut.

In the present exemplary embodiment, the upper end portion 30A of the reinforcing member 30 extends as far as the connection portion between the front pillar 18 and the front header 32 thereby enabling collision load input to the front pillar 18 to be transmitted to the front header 32 through the reinforcing member 30. This enables collision load to be more effectively transmitted than in configurations in which the upper end portion 30A of the reinforcing member 30 does not extend as far as the connection portion between the front pillar 18 and the front header 32.

In the present exemplary embodiment, the lower end portion 30B of the reinforcing member 30 is positioned further toward the lower side than the boundary portion between the inclined section 20 and the enlarged width section 22 of the front pillar 18. Namely, the reinforcing member 30 extends as far as the enlarged width section 22. This enables localized snapping of the inclined section 20 of the front pillar 18 in a vehicle head-on collision to be effectively suppressed.

Second Exemplary Embodiment

Figure 4:
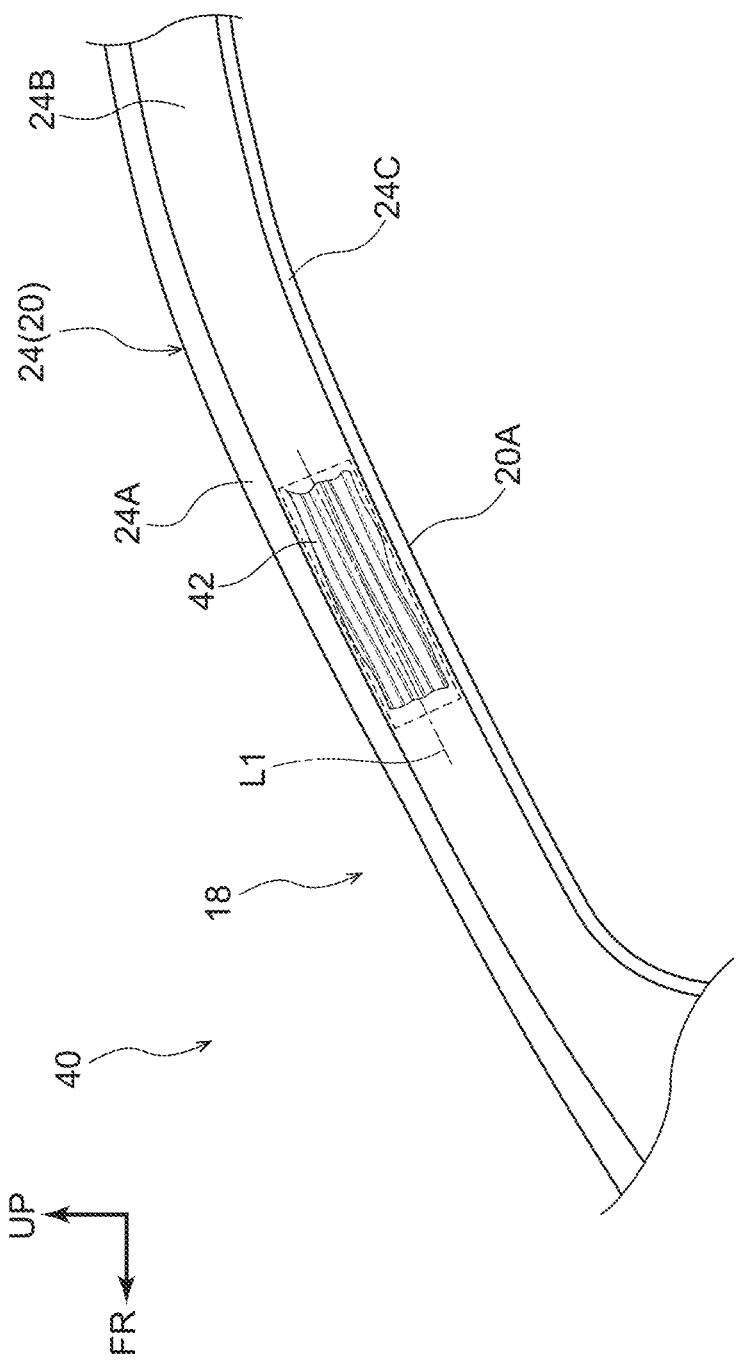
FIG. 4 is an enlarged view corresponding to FIG. 2, illustrating a front pillar of a vehicle installed with a vehicle side section structure according to a second exemplary embodiment.

Explanation follows regarding a vehicle side section structure according to a second exemplary embodiment, with reference to FIG. 4. Note that similar configuration to the first exemplary embodiment is appended with the same reference numerals, and explanation thereof is omitted as appropriate.

As illustrated in FIG. 4, the front pillar 18 is provided to a side section of a vehicle 40 applied with the vehicle side section structure according to the present exemplary embodiment. A reinforcing member 42 is provided inside a cross-section of the front pillar 18.

Note that the axial center direction of the tree rings of the reinforcing member 42 of the present exemplary embodiment is oriented in a direction running along the length direction of the front pillar 18, similarly to in the first exemplary embodiment. Namely, the axial center of the tree rings of the reinforcing member 42 extend along the imaginary line L1 extending along the length direction of the front pillar 18.

In the present exemplary embodiment, the reinforcing member 42 is only disposed at a location of the front pillar 18 that would otherwise be vulnerable to localized deformation. Specifically, the reinforcing member 42 of the present exemplary embodiment is disposed at a vehicle front-rear direction central portion of the inclined section 20 of the front pillar 18. The reinforcing member 42 of the present exemplary embodiment is formed shorter in the vehicle front-rear direction than the reinforcing member 30 of the first exemplary embodiment.

Operation

Explanation follows regarding operation of the present exemplary embodiment.

In comparison to the first exemplary embodiment, in the vehicle side section structure of the present exemplary embodiment the reinforcing member 42 has a shorter vehicle front-rear direction length than its counterpart in the first exemplary embodiment. This enables the front pillar 18 to be made lighter in weight than in the first exemplary embodiment, while suppressing localized deformation of the front pillar 18.

Vehicle side section structures according to the first exemplary embodiment and the second exemplary embodiment have been explained above. However, obviously various modifications may be implemented within a range not departing from the spirit of the present disclosure. For example, in the above exemplary embodiments, the reinforcing member is formed using block-shaped engineered wood. However, there is no limitation thereto, and a reinforcing member may be formed using natural wood. In such cases, for example, a method to machine the wood into a shape corresponding to the closed cross-section of the front pillar 18 is applied in advance.

In the above exemplary embodiments, the reinforcing member 30 is disposed inside the closed cross-section formed by the pillar inner panel 26 and the outer reinforcement 28, and the side member outer panel 24 is disposed further toward the vehicle outer side than the outer reinforcement 28. However, there is no limitation thereto. For example, a configuration that does not employ the side member outer panel 24 may be applied. Namely, the outer reinforcement 28 may configure a styling face of the front pillar 18, with the reinforcing member 30 being disposed between the outer reinforcement 28 and the pillar inner panel 26. In such a structure, the outer reinforcement 28 is shifted toward the vehicle outer side by an amount commensurate with the absence of the side member outer panel 24, thereby enabling a larger closed cross-section to be secured, and enabling the reinforcing member 30 to be made larger in size.

What is claimed is:

1. A vehicle side section structure, comprising:
    a pair of front pillars that are respectively provided at both sides in a vehicle width direction of a vehicle front section;
    a reinforcing member formed of wood and provided inside a cross-section of at least one of the pair of front pillars, an axial center direction of tree rings of the reinforcing member being oriented in a direction running along a length direction of the at least one front pillar; and
    a front header that couples upper end portions of the pair of front pillars together in the vehicle width direction,
    wherein the at least one front pillar includes:
        an inclined section that is inclined toward a vehicle lower side on progression from a vehicle rear side toward a vehicle front side, and
        an enlarged width section that extends from a lower end portion of the inclined section toward the vehicle lower side and is wider in width than the inclined section,
    wherein the reinforcing member is arranged in a central portion of the inclined section, without reaching a boundary between the inclined section and the enlarged width section, and without reaching a connecting portion between the at least one front pillar and the front header, and
    wherein the boundary is at an upper end of a curved portion formed at the vehicle rear side of an upper end portion of the enlarged width section,
    the at least one front pillar further includes a pillar inner panel, an outer reinforcement, and a side member outer panel,
    each of the pillar inner panel, the outer reinforcement, and the side member outer panel has an outward flange and an inward flange,
    the outward flanges of the pillar inner panel, the outer reinforcement, and the side member outer panel are joined together,
    the inward flanges of the pillar inner panel, the outer reinforcement, and the side member outer panel are joined together, and
    the reinforcing member is received between and contacts the pillar inner panel and the outer reinforcement.

2. The vehicle side section structure of claim 1, wherein:
    the at least one front pillar further includes a foamed material,
    the side member outer panel has an inner face that faces toward the outer reinforcement, the reinforcing member and the pillar inner panel, and
    the foamed material is attached to the inner face of the side member outer panel.

* * * * *